United States Patent [19]

Beccaris

[11] 4,260,048
[45] Apr. 7, 1981

[54] CLUTCH FRICTION DISC HAVING AXIAL ELASTICITY

[75] Inventor: Carlo Beccaris, Santena, Italy

[73] Assignee: Societe Anonyme Francaise du Ferodo, Paris, France

[21] Appl. No.: 32,029

[22] Filed: Apr. 20, 1979

[30] Foreign Application Priority Data

Apr. 26, 1978 [FR] France .................. 78 12365

[51] Int. Cl.³ .............................................. F16D 13/69
[52] U.S. Cl. ................................................ 192/107 C
[58] Field of Search ............... 192/70.13, 70.14, 106.1, 192/106.2, 107 R, 107 M, 107 C, 109 B

[56] References Cited

U.S. PATENT DOCUMENTS

| 2,270,477 | 1/1942  | Ruesenberg | 192/107 C |
| 2,337,097 | 12/1943 | Geyer      | 192/107 C |
| 2,502,653 | 4/1950  | Kelleher   | 192/107 C |
| 2,533,789 | 12/1950 | Goodchild  | 192/107 C |

FOREIGN PATENT DOCUMENTS 1170215 11/1969 United Kingdom .

Primary Examiner—George H. Krizmanich
Attorney, Agent, or Firm—Charles E. Brown

[57] ABSTRACT

The invention concerns a friction disc for a clutch, of the kind comprising a central hub having a plurality of radial blades carrying the friction linings on each outer face. The friction disc is provided with axial resiliency or "give" by forming each radial blade from two axially displaceable plates which are urged apart elastically, and coupling means are provided between the plates to limit the degree of axial displacement thereof. According to the invention, the coupling means comprise a lug integral with one plate which engages in a simple recess formed in the lateral edge of the other plate. Preferably a lug and a recess are formed in each plate, and the plates are identical.

The construction simplifies the assembly of the friction disc and provides significant cost savings in manufacture.

4 Claims, 6 Drawing Figures

CLUTCH FRICTION DISC HAVING AXIAL ELASTICITY

BACKGROUND OF THE INVENTION

This invention relates generally to friction discs intended for use in clutches, such as for example motor vehicle clutches, and it relates more particularly to those friction discs comprising a central boss or flange and a plurality of radial blades integral therewith each fitted with an individual friction lining on each outer face, the said blades each being formed by two plates which, at least over their operative portion, i.e. the portion having the friction lining, are spaced from each other, with the intervention of resilient means applying an axial thrust which urges the plates apart from each other, these plates being attached to each other by coupling means with a unidirectional axial action adapted to limit the spacing of the plates.

As a result of the resilient means provided within these blades, a friction disc of this kind has axial resiliency which is favourable to the satisfactory engagement of the clutch with which it is associated, and favourable to reduced wear of the friction linings; when the clutch is disengaged, the plates which constitute the blades of its friction disc are at an axial spacing from each other and, when the clutch is engaged, i.e. when it is moved into the engaged position, the pressure elements which establish this engagement first of all cause the plates to move together in the axial direction, to meet the resilient means inserted between the plates, before effecting positive locking of the blades as a whole.

A friction disc of this kind with axial resiliency is described in U.S. Pat. No. 3,526,307.

The teaching of this U.S. patent, which is the most commonly used solution, is that the coupling means with a unidirectional axial action which connect each pair of plates consist of small columns or lugs formed separately from the plates and attached to one of them e.g. by crimping, the said lugs passing, with some play, through passages formed for this purpose in the other plate, and comprising, beyond the plates, a shoulder adapted to co-operate with the latter plate by abutting thereon.

This construction has a number of disadvantages.

Firstly, since it uses special parts which have to be made individually and then assembled with the plates, it is relatively expensive.

Moreover, the lugs used result in practice in the presence of a not inconsiderable axial projection on each of the faces of the blades of the friction disc, and because of the corresponding circumferential dimensions, this inevitably limits the surface area of these blades over which the friction linings can extend.

Consequently, for a particular surface area of the blades, there is a limitation, possibly a detrimental limitation, of the surface area of the friction linings carried on the blades, or, for a given surface area of the friction linings, there is an increase in the surface area required for the blades, which is always expensive since it involves a larger amount of material.

In British Pat. No. 1,170,215, the coupling means with a unidirectional axial action which connect each pair of plates are integral with these plates, thus avoiding at least some of the disadvantages mentioned above.

However, in the construction proposed in this British Pat. No. 1,170,215, these coupling means act fully on the surface, i.e. at a spacing from the contours of the plates in question, and these coupling means comprise a lug formed in one plate and engaging in an opening formed in the other.

This makes assembly of the disc more complicated.

It also means that each blade has to be formed by two separate parts, thus increasing the price of the assembly.

The present invention relates generally to a construction of the coupling means with a unidirectional axial action which is both simple and economical to achieve in practice.

SUMMARY

The invention provides a friction disc with inherent axial resiliency, of the kind comprising a flange and a plurality of radial blades which are integral with the flange and which are provided with an individual friction lining on each of their two outer faces, the said blades each being formed by two plates which, at least in their operative portions, i.e. the portions having the friction lining, extend at an overall spacing from each other overall, the plates being urged apart resiliently by resilient means with an axial action, and these plates being attached to each other by coupling means with a unidirectional axial action adapted to limit the spacing of the plates, the coupling means comprising, for one of the plates, a tab which is integral with the plate and, for the other plate, a passage in which the said tab engages and on the edge of which passage the tab is hooked, the assembly being characterised in that the passage through which the said tab passes comprises a simple recess formed in the corresponding lateral edge of the respective plate.

Thus, these coupling means act on the very edges of the plates which they connect.

This considerably simplifies the assembly of the plates.

It also means that these blades can advantageously, and economically, be identical to each other.

Furthermore, on the side of the blade from which the tab projects, the coupling means of which this tab is a part do not project at all axially from the face of this blade opposite the other blade, and consequently, if desired, the corresponding friction lining may advantageously extend at least partly without any discontinuity over the said coupling means.

DESCRIPTION OF THE PREFERRED EMBODIMENTS

Figure 1:
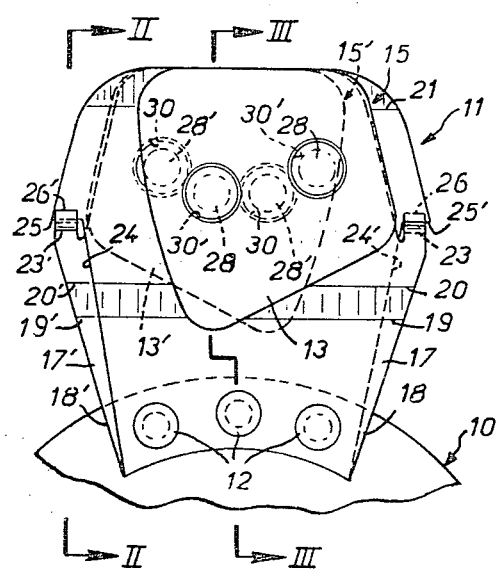
FIG. 1 is a partial elevation of a friction disc according to the invention.

Generally, a friction disc according to the invention comprises an annular flange 10, only partially shown in the figures, and a plurality of radial blades 11, only one of which is shown in the drawings.

In its central zone, the flange 10 is integral, either directly, or indirectly via torsion damping means, with a boss adapted to couple it rotationally to a shaft, for example a driven shaft (not shown).

Each of the blades 11 is made integral with the flange 10, for example via rivets 12, as shown, and comprises an individual friction lining 13, 13' on each of its two outer faces.

In practice, the friction linings 13, 13' are mounted on a support plate 14, 14' respectively, and are attached, via the plates, as will be described hereinafter, to the appropriate blade 11, the unit consisting of friction linings 13, 13' and their support plates 14, 14' jointly forming a friction segment 15, 15' respectively.

Since the apparatus in question is a friction disc with axial resiliency, each blade 11 is formed, in a manner known per se, by two thin plates 17, 17' which, at least over their operative portion, i.e. the portion comprising a friction segment 15, 15', extend at a spacing from each other overall, with the interposition of resilient means with an axial action which tend to urge them apart, and the plates are attached to each other by coupling means with a unidirectional axial action adapted to limit their spacing against the action of the resilient means.

In the embodiment shown, these axially acting resilient means are associated with the plates 17, 17' themselves, again in a manner known per se, the plates being designed for this purpose: starting from a root 18, 18' by which they are made integral with each other by means of rivets 12, these plates comprise, in succession, a first fold 19, 19' from which they diverge from each other, a second fold 20, 20' after which they extend parallel to each other to form their operative portion, and a third fold 21, 21' after which they converge towards each other, close to their radial ends.

Figure 2:
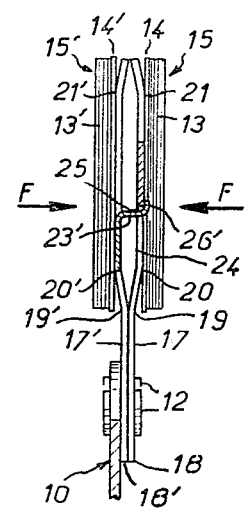
FIGS. 2 and 3 are partial sections, on the lines II—II and III—III, respectively, of the friction disc shown in FIG. 1.

When an axial movement is exerted on the plate 17, 17' to bring them closer, in the direction of arrows F in FIG. 2, their various folds move resiliently, and when this axial movement of bringing them together is stopped the plates 17, 17' return to their initial configuration, as shown in FIG. 2.

This initial configuration is defined by the coupling means with a unidirectional axial action, which are provided for this purpose between the plates 17, 17'.

In the manner known per se from British Pat. No. 1,170,215 mentioned above, these coupling means are integral with the plates 17, 17' which they join together.

According to the invention, the coupling means are formed along each of the two circumferentially opposite lateral edges of each of the blades 11.

For each of the said lateral edges, these coupling means comprise, for each plate 17, 17', a tab 23, 23' made in one piece with this plate, and a passage 24, 24' in which the tab 23, 23' on the other plate engages and on the edge 25, 25' of which it is hooked.

Figure 3:
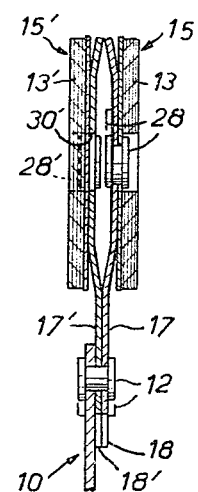

For example, as shown in FIGS. 1 to 3, a tab 23, 23' of this kind is hooked by a quarter turn 26, 26' over the edge 25, 25' of the passage 24, 24' through which it passes, this tab being formed by folding out at right angles a tongue which is cut out from the plate 17, 17' in question.

In the embodiment shown, the tongue is folded in a direction substantially perpendicular to the axial plane of the flange 10 passing through the median zone of the blade 11 in question, and the same applies to the folding of the returned portion 26, 26', so that the latter extends radially overall, relative to this annular flange.

Moreover, according to the invention, the passage 24, 24' through which a tab 23, 23' passes is formed by a simple recess in the corresponding lateral edge of the plate 17, 17' in question.

As will readily be understood, by means of their returned portions 26, 26' the tabs 23, 23' limit the axial spacing of the plates 17, 17' relative to each other.

Also, as will be seen, the plates 17, 17' are advantageously identical to one another.

In the embodiments shown, the friction segments 15, 15' are also identical and are connected to the corresponding plates 17, 17' by rivets.

In FIGS. 1 to 5, the segments 15 have a contour which is substantially in the form of an isosceles trapezium and, for each of them, two rivets 28, 28' are provided, which extend substantially along their axis of symmetry.

To ensure that the head of the rivet which is inside the volume defined by the plates 17, 17' does not restrict the axial clearance of the plates when they are moved towards each other as the clutch engages, the friction segments 15, 15' are inclined in opposite directions relative to each other from one plate 17 or 17' to the other, and, for each of these segments, the opposite plate 17, 17' comprises, opposite corresponding rivets 28, 28', an opening 30, 30' into which the heads of the rivets can extend.

In the embodiment shown in FIGS. 1 to 3, and in the manner known per se, especially from U.S. Pat. No. 3,525,307 mentioned above, the friction segments 15, 15' are mounted on the plates 17, 17' substantially inside a sector defined by the coupling means with a unidirectional axial action provided between the plates 17, 17', taking into account the fact that these segments are inclined in opposite directions relative to each other.

Figure 4:
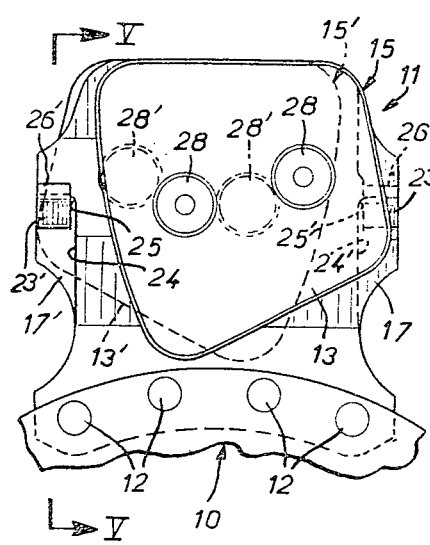
FIGS. 4 and 5 are analogous views to those in FIGS. 1 and 2, respectively, and show an alternative embodiment.
Figure 5:
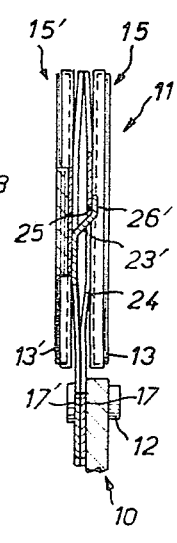

In the alternative embodiment shown in FIGS. 4 and 5, use is made of the fact that the tab 23, 23' belonging to these coupling means does not produce any axial projections of the face of the plate 17, 17' with which it is associated and which comprises a friction segment.

To achieve this, with one of the lateral edges of a blade 11, the tab is made in one piece with a first of the plates 17, 17', e.g. the plate 17, and with the other edge, the corresponding tab is made in one piece with the second plate, i.e. the plate 17'.

Thus, for the plate 17, 17' which is integral with the tab 23, 23' belonging to the coupling means which connect this plate to the other, according to the invention, the corresponding friction segment 15, 15' and hence the friction lining which it comprises may extend in the vicinity of the coupling means at least partly without any discontinuity over the said coupling means, i.e. they may at least partly cover the zone of the relevant plate from which the corresponding tab 23, 23' is formed, and this is the case in the embodiment shown in FIGS. 4 and 5.

All other conditions being equal, the surface area available for the mounting of a friction segment 15, 15' is increased, or the surface required for the plates 17, 17' which constitute a vane 11 is reduced.

Moreover, in the embodiment shown in FIGS. 4 and 5, to make construction easier, the tabs 23, 23' extend obliquely relative to the plates 17, 17', and not at right angles as before. Moreover, the lateral edges of the plates are broadly indented.

Figure 6:
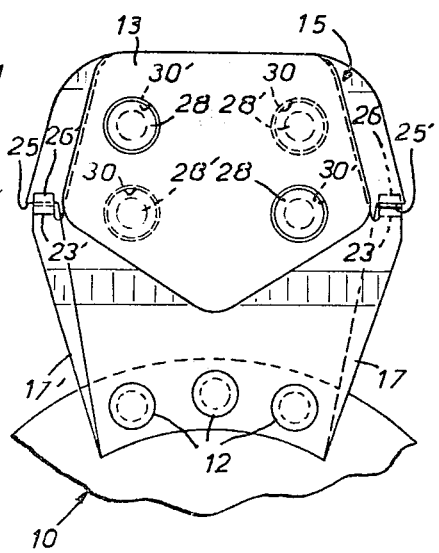
FIG. 6 is another view analogous to that in FIG. 1 and shows another alternative embodiment.

In the variant shown in FIG. 6, which relates to the means used to prevent the rivets 28, 28' of the friction segments 15, 15' from impeding the axial deflection of the plates 17, 17', these rivets are arranged diagonally for the same friction sector, and from one friction sector to the other, the corresponding diagonals are inclined in opposite directions in arrangements known per se, e.g. from French Pat. No. 1,096,552.

This invention is not restricted to the embodiments described and shown, but covers all variants within the scope of the appended claims.

In particular, although in the embodiments shown the plates 17, 17' are both arranged on the same side of the flange 10 which bears them, they could also be arranged on both sides of this flange, in per se known manner.

In addition, the resilient means acting between the plates do not necessarily have to be integral with the plates, but could be produced from separate parts suitably inserted between these plates, again in manner known per se.

Finally, the tabs 23, 23' could both be formed on the same plate 17 or 17', although it is advantageous, as mentioned above, for the plates 17, 17' to be identical to each other.

I claim:

1. A clutch friction disc incorporating axial resiliency of the type comprising a flange and a plurality of radial blades integral with said flange and each radial blade being provided with an individual friction lining on each outer face thereof, each of the said blades being formed by two plates which, at least over their operative portion provided with said friction lining, extend at an overall spacing from each other, and which are urged apart resiliently by resilient means with an axial action, said plates being interconnected by coupling means with a unidirectional axial action adapted to limit the spacing of the plates, and said coupling means comprising, for one plate, a tab which is integral with said one plate, and, for the other plate, a passage in which the said tab engages and on the edge of which said tab is hooked, said passage through which said tab passes comprising a simple recess formed in the corresponding lateral edge of said other plate.

2. A clutch friction disc according to claim 1, wherein for each blade, said coupling means are provided adjacent two opposite lateral edges of said blade, whereby for one of said lateral edges, said tab of said coupling means is integral with a first one of said plates constituting the blade in question and, for the other of said lateral edges, said tab of said coupling means is integral with a second one of said plates.

3. A clutch friction disc according to claim 2, wherein for a plate which is integral with said tab belonging to said coupling means which connect this plate to the other, said friction lining in the general vicinity of said coupling means extends at least partly without any discontinuity over said coupling means.

4. A clutch friction disc according to claim 1, wherein said two plates which constitute a blade are identical to each other.

* * * * *